(12) United States Patent
Nakano et al.

(10) Patent No.: US 7,140,790 B2
(45) Date of Patent: Nov. 28, 2006

(54) SECTOR DRIVE ASSEMBLY FOR CAMERA

(75) Inventors: Yoichi Nakano, Chiba-ken (JP);
Hiroshi Takahashi, Chiba-ken (JP)

(73) Assignee: Seiko Precision Inc. (JP)

( * ) Notice: Subject to any disclaimer, the term of this patent is extended or adjusted under 35 U.S.C. 154(b) by 113 days.

(21) Appl. No.: 10/825,549

(22) Filed: Apr. 14, 2004

(65) Prior Publication Data

US 2004/0223076 A1 Nov. 11, 2004

(30) Foreign Application Priority Data

Apr. 14, 2003 (JP) ............................ 2003-109415

(51) Int. Cl.
*G03B 9/08* (2006.01)
*G03B 9/40* (2006.01)

(52) U.S. Cl. ........................ 396/463; 396/484; 396/489

(58) Field of Classification Search ........ 396/483–489, 396/491, 492, 452, 463, 464, 468, 469
See application file for complete search history.

(56) References Cited

U.S. PATENT DOCUMENTS

| | | | | |
|---|---|---|---|---|
| 4,339,190 A | * | 7/1982 | Sugiura | ...................... 396/469 |
| 5,117,137 A | * | 5/1992 | Kobayashi | ................. 310/49 R |
| 5,555,059 A | * | 9/1996 | Seo et al. | ................... 396/463 |
| 5,749,014 A | * | 5/1998 | Shimada | ..................... 396/489 |
| 5,973,399 A | * | 10/1999 | Stark et al. | ................. 257/731 |
| 6,485,200 B1 | * | 11/2002 | Tanikawa et al. | ........... 396/489 |
| 6,536,962 B1 | * | 3/2003 | Takahashi | ................... 396/466 |

* cited by examiner

*Primary Examiner*—W. B. Perkey
*Assistant Examiner*—Rishi Suthar
(74) *Attorney, Agent, or Firm*—Adams & Wilks (57) ABSTRACT

A sector drive assembly for a camera which can open and close an aperture has a sector drive unit having an actuator, a drive force transmitting mechanism, and a sector position detecting unit that are removably mounted as a unit to a support plate, and a sector unit having a base plate formed with an aperture and one or more sectors for opening and closing the aperture. Since the sector drive unit is provided as a removably mountable unit, it is high in versatility and can be mounted to various different types of sector units. In addition, since it is configured to detect the state of the sectors before operation, reliable exposure or opening and closing of the aperture are achieved. In addition, a positional adjustment function is provided by a sector urging spring.

14 Claims, 6 Drawing Sheets

SECTOR DRIVE ASSEMBLY FOR CAMERA

BACKGROUND OF THE INVENTION

1. Field of the Invention

The present invention relates generally to a sector drive assembly for a camera and, more particularly, to a sector drive assembly for driving a light-shielding device to protect an image pickup device such as a CCD or a CMOS device of a digital camera.

2. Description of the Related Art

In a diaphragm or shutter device of a conventional silver-film-type camera (hereinafter referred to as a "film-type camera") or a light-shielding device used for protecting an image pickup device of a digital camera, a mechanism for opening and closing an aperture by the pivotal movement of plural sectors is generally employed. Both the conventional diaphragm device and light-shielding device are capable of opening and closing an aperture and adjusting the size of a diaphragm opening by pivoting the sectors by use of a drive motor. The sectors are driven by the drive motor via a drive force transmitting mechanism. The drive motor, the drive force transmitting mechanism, and the sectors are all mounted on a base plate.

When all of the sectors, the drive motor, and the drive force transmitting mechanism are mounted to the base plate, the entire base plate assembly is deemed defective when any one of these three separate units has a defect, resulting in a reduction in manufacturing yield. In addition, since these small components must be assembled in sequence, assembly of the device involves a complex process.

SUMMARY OF THE INVENTION

In order to solve the above-described problem, a sector drive unit for a camera according to the present invention is characterized in that the assembly and replacement of components are facilitated by employing a configuration in which a sector unit and a sector drive unit are provided as separately replaceable units. More specifically, the sector unit includes a base plate having an aperture and sectors for opening and closing the aperture. The sector drive unit includes a support plate, an electromagnetic actuator mounted to the support plate, and a drive force transmitting mechanism mounted to the support plate for transmitting a drive force of the electromagnetic actuator to the sectors.

The sector unit and the sector drive unit are characterized by being provided with a unit structure that is removably mountable to each other via the support plate, the base plate and fixing members. Since the sector drive unit of the present invention has a sector unit and a sector drive unit which are separately manufactured as separate unit structures, ease of manufacture and compatibility are improved. When the sector drive unit is employed as a sector drive unit for a light-shielding device for protecting the image pickup device of a digital camera, a light-shielding curtain is reliably opened during an exposure operation and closes the aperture for reliably protecting the image pickup device during the period when exposure is not performed.

The sector drive unit for a camera according to the present invention can be used in a camera having a sector unit composed of a base plate having an aperture, and one or more sectors each formed with a diaphragm opening smaller than the aperture. According to the configuration of the inventive sector drive unit for a camera, a desired diaphragm opening can be selected by driving and pivoting the sectors having the diaphragm opening smaller than the aperture by means of a lever which corresponds to an output end of the drive force transmitting mechanism.

The configuration of the inventive sector drive unit for a camera preferably employs the following detailed characteristics. First, the sector unit is preferably provided with a sector urging spring for urging the sectors in one direction for reducing distortion generated due to a gap formed during manufacture or a backlash of gears, that is, positional adjustment. Accordingly, a reliable light-shielding effect is achieved in the case of the light-shielding unit of a digital camera, and a desired aperture value is achieved in the case of the diaphragm device of a film-type camera. Second, by providing a sector position detecting unit for detecting the driving state of the sector from the positional relation of the drive force transmitting mechanism on the sector drive unit, whether the setting of the opening of the aperture or the aperture value is reliably performed can be verified before exposure, and thus an adequate exposure is ensured. In relation to the second characteristic, it is preferable for the digital camera to set the sector position detecting unit such that a signal is switched immediately after the aperture is fully opened, or the diaphragm opening reaches the maximum opened state. This ensures a reliable exposure operation and an aperture value because a signal indicating that the sector position detecting unit detects the detecting object, if at all, is supplied to the CPU in a camera body.

DESCRIPTION OF THE PREFERRED EMBODIMENTS

Referring now to the drawings, an embodiment of the present invention will be described. In this description, a sector drive unit for driving sectors of a light-shielding device of a digital camera will be primarily described as an example, but this is not intended to limit the invention to such application.

Figure 1:
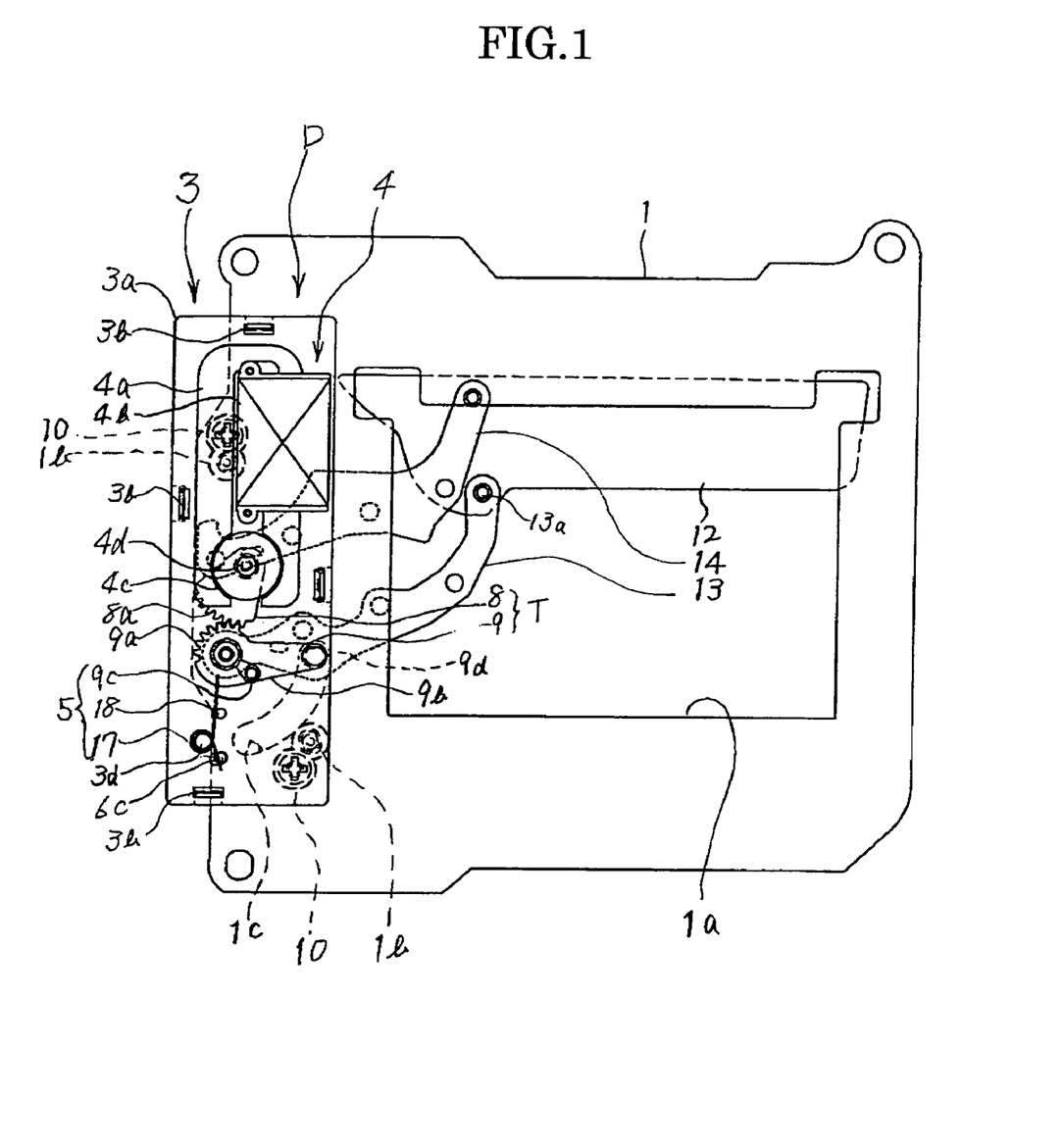
FIG. 1 is a plan view of a first preferred embodiment of the light-shielding device of the present invention in a state where an aperture is fully closed.
Figure 2:
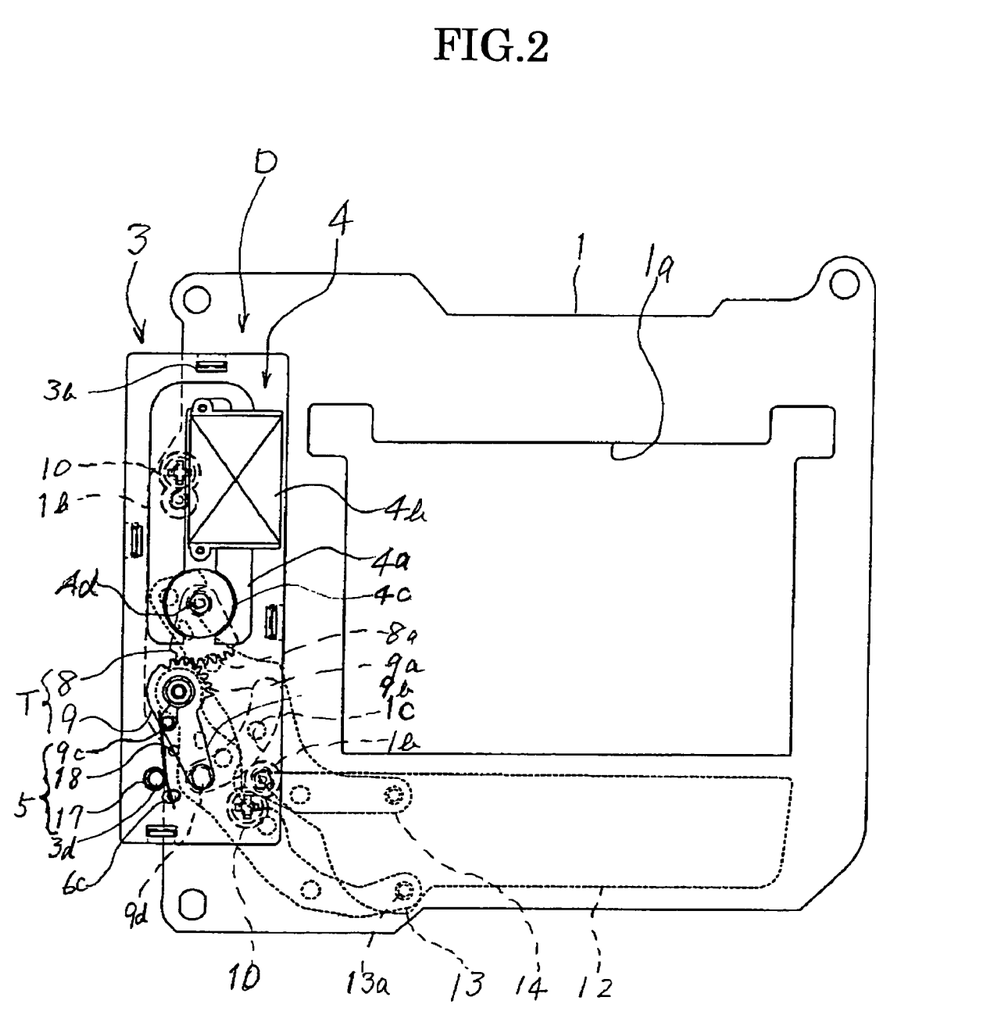
FIG. 2 is a plan view of the light-shielding device of the first preferred embodiment in a state where the aperture is fully opened.

FIGS. 1 and 2 are enlarged drawings of a principal portion of a light-shielding device of a digital camera according to a first preferred embodiment of the present invention. In these drawings, only the details of the plate and associated elements are shown. The detailed structure of a printed board P and a top plate of a support plate 3, which will be described later, is omitted from the drawing to more clearly show the internal structure. As shown in FIGS. 1 and 2, the light-shielding device is structurally similar to a focal-plane shutter in that the aperture can be opened and closed by a group of sectors which superimpose each other and are cooperatively deployed with each other to open and close the aperture. However, the light-shielding device does not have a front curtain and a rear curtain as does the focal-plane shutter. Instead, the light-shielding device simply has one light-shielding curtain which corresponds to either the front or the rear curtain of the focal plane shutter.

In the illustrated embodiment, a structure having sector arms 13, 14 and sectors 12, which correspond to light-shielding curtains mounted on a base plate 1, is referred to as a sector unit U. The drive mechanism for opening and closing the sector unit U is referred to as a sector drive unit D. One of the characteristics of the present invention is that the sector drive unit D is provided as a unit that is removably mountable to the base plate 1 so that it can be easily attached to and detached from the base plate 1.

The base plate 1 comprises a plate body formed substantially in a rectangular shape and provided with an aperture 1a near the center thereof. The sector drive unit D for driving the sectors 12 is provided on the upper surface of the base plate 1 on the left side of the aperture 1a (as viewed relative to the plane of FIGS. 1 and 2). The sector drive unit D is positioned by positioning pins 1b, 1b projecting from the upper surface of the base plate 1, and is fixed thereto with screws 10, 10, which correspond to fixing members (See FIG. 3). The sector arms 13, 14, which will be described below, and the sectors 12 are provided on the back of the base plate 1 opposed to the sector drive unit D, so that the aperture 1a can be opened and closed by driving the sectors 12 via the sector drive unit D.

The sector drive unit D includes an electromagnetic actuator (hereinafter referred to as an "actuator") 4 mounted to the support plate 3 in advance via an intermediate member 6 described later, a synchronous switch 5 which corresponds to a sector position detecting unit described later, and a drive force transmitting mechanism T mounted on the lower side of the intermediate member 6 (as shown more clearly in FIGS. 3 and 4). The printed circuit board P for supplying electric power to the actuator 4 and the synchronous switch 5 are provided above the sector drive unit D in FIGS. 3 and 4. The sector unit U includes, as described above, the base plate 1, the sectors 12 provided on the lower surface of the base plate, and the sector arms 13, 14 for driving the sectors. The sector drive unit D is mounted on the upper surface of the base plate 1 and is positioned with screws 10 serving as fixing members.

Figure 3:
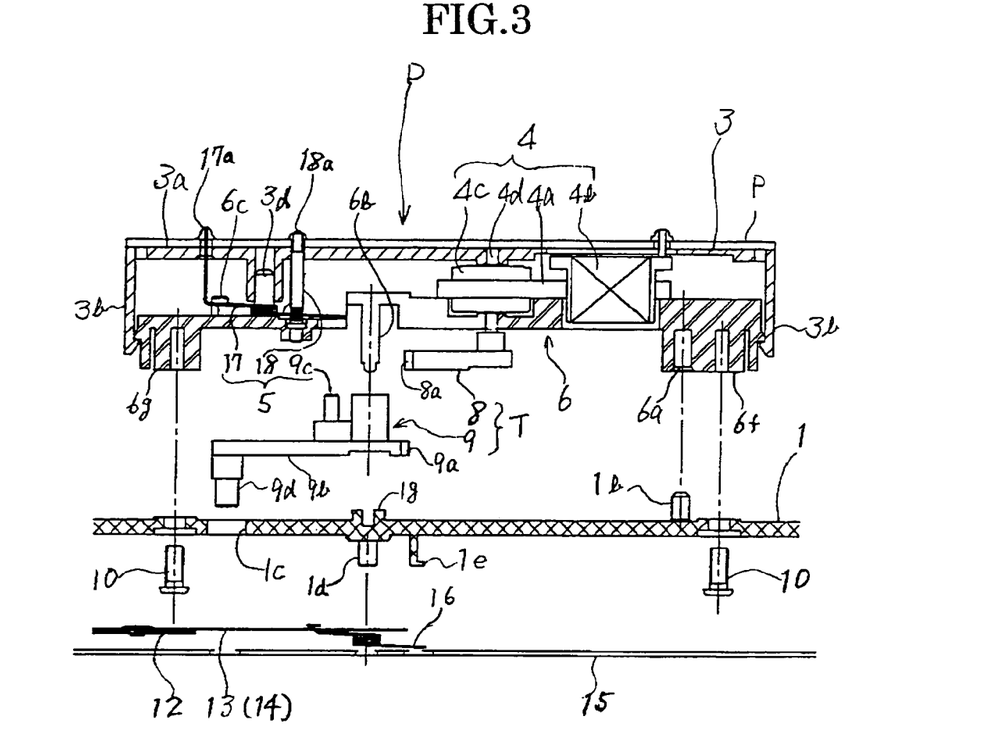
FIG. 3 is an enlarged exploded cross-sectional view of a principal portion of the light-shielding device.

FIG. 3 is an enlarged crosssectional view showing the respective mechanisms, including the sector drive unit D and the sector unit U, in a separated or partially exploded manner. The drive mechanism of the sector drive unit D includes the actuator 4 and the synchronous switch 5, which are fixed via the intermediate member 6, which is opposed to and detachably mounted to the rear surface of the support plate 3. The printed circuit board P is fixed to the upper surface of the support plate 3. The support plate 3 includes a bottom plate member 3a formed of a rectangular plate member (See FIG. 1), and latch devices 3b, 3b for removably retaining the intermediate member 6 at both ends thereof. The intermediate member 6 retains the actuator 4 and the synchronous switch 5 in predetermined positions between the support plate 3 and the intermediate member 6, and the intermediate member 6 is provided with mounting portions 6f, 6g that are removably mountable to the base plate 1. Since the sector drive unit D is thus configured as an independent unit which can easily be attached to and detached from the base plate 1, it can be mounted to various sector units.

The actuator 4 described above is a pulse motor of known construction and includes a stator 4a, a drive coil 4b, and a rotor 4c formed of a permanent magnet. The actuator 4 has plural static stable positions in which the rotor 4c is retained statically without the supply of power. These static stable positions are defined by the positions of the magnetic poles of the rotor 4c and the positions of the magnetic poles provided on the stator 4a. Therefore, when the magnetic poles of the rotor 4c move between the magnetic poles of the stator with the supply of power, the rotor 4c can be retained at a static stable position. The number of the static stable positions is determined by the number of magnetic poles of the rotor 4c and the number of magnetic poles provided on the inner peripheries of the recesses of the stator 4a, which surround the rotor. In the present embodiment, two of the static stable positions are provided by the combination of two magnetic poles on the rotor and four magnetic poles of the stator. The actuator 4 is secured by being pressed against the bottom board member 3a of the support plate 3 by the intermediate member 6. A rotary shaft 4d is formed integrally with the rotor 4c so as to penetrate the intermediate member 6 and project from the lower surface thereof.

A drive lever 8 constituting part of the force transmitting mechanism T is fixed to the extremity (lower end in FIG. 3) of the rotary shaft 4d formed integrally with the rotor 4c of the actuator 4. A sector drive lever 9, which can be interlocked with the drive lever 8, is pivotably supported by a shaft supporting device 6b projecting from the lower surface of the intermediate member 6 (as seen in FIG. 3). The sector drive lever 9, constituting a part of the force transmitting mechanism T, is interlocked with the drive lever 8 by engagement of teeth 9a thereof with teeth 8a of the drive lever 8. As shown in FIGS. 1 and 2, the drive lever 8 is configured as a fan-shaped plate member fanning out to a small extent, and the narrow end portion of the fan is secured to the rotary shaft 4d of the actuator 4 so as to be capable of integrally rotating therewith. An arcuate portion formed at the extremity of the drive lever 8 has teeth 8a thereon. The sector drive lever 9 has a portion formed into an arcuate shape in a range of a predetermined distance from the rotational center, and this arcuate portion is provided with the teeth 9a along part of the periphery thereof, which can engage the teeth 8a of the drive lever. Part of the arcuate portion which is not provided with the teeth 9a extends outward and is formed into an arm member 9b. In the vicinity of the boundary between the above-described arcuate portion and the arm member 9b, a contactable pin 9c, described below, is provided at the extremity of a short arm so as to project upward (in FIGS. 3 and 4). On the lower surface of the extremity of the arm member 9b, there is provided a drive pin 9d to drive the sector unit U described above.

With this arrangement, the drive force transmitting mechanism T is configured such that the drive lever 8 is pivoted by the rotation of the rotor 4c of the actuator 4, and the sector drive lever 9 is interlocked with the drive lever 8 via a gear transmission mechanism. The pivoting angle of the drive lever 8 corresponds to the ratio of the distances from the respective pivots to the pitch circles of the respective teeth. The pivoting angle of the sector drive lever 9 is the same as the pivoting angle of the sector arm 13, and the amount of reciprocal movement of the sectors 12 is determined depending on the pivoting angle of the sector drive lever 9 and the length of the sector arm 13. In the drawings, the distances from the pivots of the respective members to the pitch circles of the respective teeth are illustrated to be different from each other, and hence seem to be different in pivotal angle as well. However, when the torque of the actuator 4 is considered, it is preferable to set the pivotal angles of the respective members to substantially the same angle.

The synchronous switch 5 will now be described. The synchronous switch 5 used in the sector drive unit D is a sector position detecting sensor for verifying whether the sectors 12 are fully opened at the time of exposure by detecting the driving state of the sector drive lever 9. The synchronous switch 5 includes a detection spring 17, a detection pin 18, and the contactable pin 9c. The detection spring 17 employed here is a helical coil spring having straight portions extending at opposite ends in opposite directions. A coil portion located at the center of the spring 17 is inserted onto a shaft 3d projecting from the support plate 3, so that a first one of the straight portions is capable of abutting against the contactable pin 9c of the sector drive lever 9. The second straight portion is capable of abutting against a projection 6c projecting from the upper surface of the intermediate member 6 so as to be capable of restricting the range of pivotal movement. The second straight portion is bent at a right angle so as to extend upward to provide an information output section 17a by bringing the end thereof into electrical communication with the printed circuit board P, thereby being capable of supplying detected data to a CPU of a camera body.

The detection pin 18 is a conductive round rod member, is supported between the printed board P and the intermediate member 6 at both ends thereof, and is in electrical communication with the printed board P. The detection pin 18 is arranged at a position where the intermediate position of the first straight portion of the detection spring 17 abuts when the sectors 12 fully open the aperture 1a, and the first straight portion can move away when the aperture 1a is closed. Detection data indicating whether the detection pin 18 is in or out of contact with the detection spring 17 can be supplied from the terminals 17a, 18a connected to the printed board P. The action by which the detection spring 17 comes into and out of contact with the detection pin 18 is achieved by causing the detection spring 17 to follow the pivotal movement of the contactable pin 9c, which is provided integrally with the sector drive lever 9.

As shown in FIG. 3, the integral connection between the base plate 1 and the drive unit D is achieved by aligning positioning pins 1b (only one of them is shown in FIG. 3) provided at a plurality of locations on the upper surface of the base plate 1 and positioning holes 6a formed on the mounting portions 6f, 6g of the intermediate member 6, pressing both of them toward each other, and securing them with the screws 10, 10 as fixing members. FIG. 4 shows a state in which the sector drive unit D is mounted to the base plate 1. In the mounted state, the sector drive lever 9 pivotably supported by the shaft 6b projecting from the intermediate member 6 is stably supported by a projection 1g projecting from the base plate 1, and the drive pin 9d penetrates an arcuate groove 1c on the base plate 1 and projects toward the lower surface thereof.

Mounted on the lower surface of the base plate 1 are the sectors 12 for opening and closing the aperture 1a and the sector arms 13, 14. The base plate 1, the sectors 12, and the sector arms 13, 14 constitute the sector unit U. As shown in FIGS. 1 and 2, the sector unit includes a plurality of sectors 12 (only one of them is shown), and a parallel link mechanism including the pair of sector arms 13, 14 for reciprocally driving the sectors 12. The first lower sector arm 13 of the sector arms constituting the parallel link mechanism is pivotably supported by the shaft 1d (See FIG. 3) which is coaxial with the rotational center of the sector drive lever 9.

The hole provided at the intermediate position of the first sector arm 13 and the drive pin 9d of the sector drive lever 9 being inserted into the hole enables the arm to follow the sector drive lever 9. The extremity of the first sector arm 13 is pivotably connected to the sectors 12 via a connecting pin 13a. The second sector arm 14 positioned upwardly of the first sector arm 13 is pivotably supported on the upper surface of the base plate 1 at a position slightly spaced apart from the supporting portion of the first sector arm. The extremities of the sector arms 13, 14 are pivotably connected to the sectors 12 so that the parallel link mechanism is established and the sectors 12 can be moved in parallel.

Figure 4:
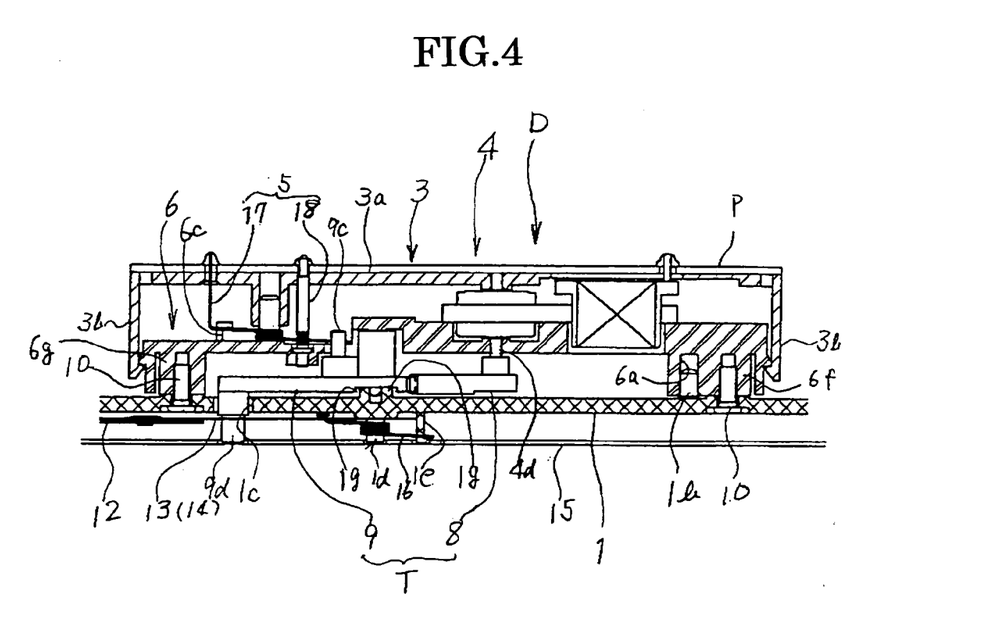
FIG. 4 is an enlarged cross-sectional view of the principal portion of the light-shielding device in an assembled state.

As shown in FIG. 4, a sector urging spring 16 for urging the first sector arm 13 in the direction to open the sectors 12 is provided on the back surface of the base plate 1. The sector urging spring 16 is formed of a helical coil spring, and the coil portion at the center is inserted onto the shaft 1d, which supports the first sector arm 13, so that one of the straight portions extending from the coil portion abuts against a locking projection 1e projecting on the back surface of the base plate 1. The other straight portion of the sector urging spring 16 abuts against the side portion of the first sector arm 13 to urge the arm in the direction to open the sectors 12. One function of the sector urging spring 16 is to facilitate the opening operation of the sectors 12 by urging the sector arm 13 at the time of a shutter release operation when the sectors 12 are at an initial position. Another function is to reduce the gap and thus the rattling generated when the aperture 1a is brought into an opened state between the drive force transmitting mechanism T and the sector unit U by pressing them in one direction, which is referred to as "positional adjustment". The sector urging spring 16 and the sectors 12 are protected by a sector retaining plate 15.

Figure 5:
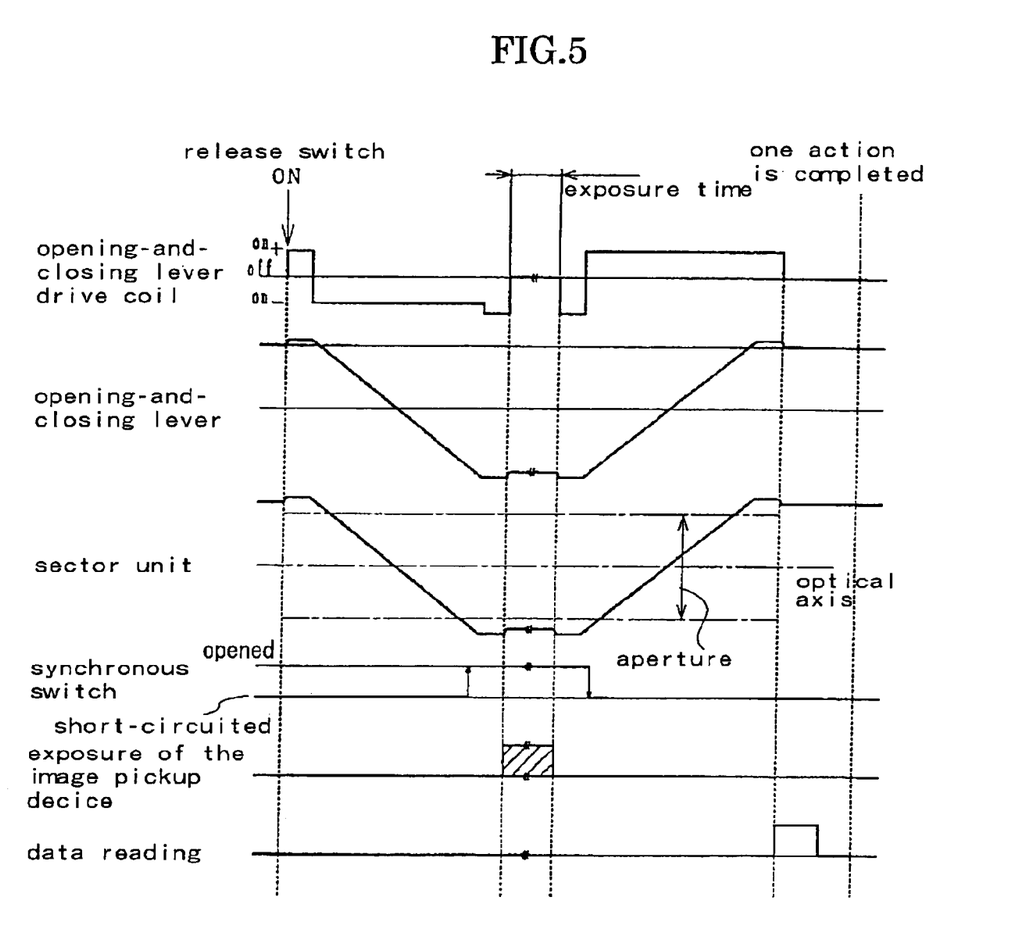
FIG. 5 is a timing chart showing the operation of the embodiment shown in FIGS. 1–4.

Referring now to a timing chart shown in FIG. 5, the operation of the first embodiment will be described. Along the ordinate shown in FIG. 5, the phrase "opening-and-closing lever drive coil" designates the drive coil 4b of the actuator 4 in the above-described configuration, the "opening-and-closing lever" designates a lever of the drive force transmitting mechanism T, and more specifically, the sector drive lever 9. The phrase "exposure of the image pickup device" designates the operation of converting an image of the imaged object into a digital signal. Although the abscissa of FIG. 5 designates time, the ratio of the length of time is not shown as the actual ratio, and is simply shown for the sake of convenience of description.

In the initial state, power supply from the actuator 4 to the drive coil 4b is turned OFF. Thus, the sector drive lever 9 and the sector unit U remain in an initial position (static stable position). At this time, the detection spring 17 and the detection pin 18 of the synchronous switch 5 abut against each other (short-circuited) (See FIG. 1). Subsequently, when the release switch (not shown) of a camera body incorporating the first embodiment is activated, only one pulse of positive current is supplied to the drive coil 4b. Accordingly, the sector unit U moves to the aperture-closing-direction to adjust the displacement of the sector unit U, that is, "positional adjustment" is performed. Then, when a negative current is supplied from the CPU to the drive coil 4b of the actuator in the direction opposite from that for the positional adjustment, the rotor 4c rotates in the opposite direction, and moves the sectors 12 via the drive force transmitting mechanism T to open the aperture 1a. At this time, the sectors 12 can easily be activated due to the biasing action provided by the sector urging spring 16. When the opening operation of the sector unit U is completed and the aperture 1a is fully opened, a slightly higher negative current is supplied in the same direction to perform "positional adjustment" and prevention of rebounding of the sectors. When this operation is completed, the supply of power to the drive coil 4b is turned OFF, and thus the sectors 12 are released from the position adjusted state. Exposure is performed by the image pickup device of the camera while the power supply is turned OFF.

In a state in which the sector unit U is fully opened, that is, in a state in which the sectors 12 are retracted and the aperture 1a fully opened, the contactable pin 9c of the sector drive lever 9 abuts against the first straight portion of the detection spring 17 of the synchronous switch 5 and presses the same counterclockwise. Therefore, the detection spring 17 is moved away (opened) from the detection pin 18 (See FIG. 2), and signal data generated by the change of the state is supplied to the CPU of the camera. The exposure operation described above is initiated when the CPU has received the signal indicating the change of the state to verify that the aperture 1a is opened and supplies an exposure-start signal to the image pickup device. During the exposure operation, since the power supply to the drive coil 4b of the actuator 4 is in the OFF state, generation of noise during exposure can be prevented, and power consumption can be reduced. The rotor 4c is retained at a static stable position with no power being supplied thereto. Thus, even while the supply of power to the drive coil 4b is turned OFF, the sectors 12 are prevented from moving accidentally.

When the exposure operation is completed, a negative current for rotating the rotor in the direction to superimpose the sectors 12 over the aperture 1a is again supplied to the drive coil 4b of the actuator to perform the positional adjustment. Subsequently, by supplying a positive current for rotating the sectors 12 in the deploying direction to the drive coil 4b, the sector drive lever 9 rotates, and simultaneously the sectors 12 close. At this time, when the sector drive lever 9 rotates counterclockwise in FIG. 1, the detection spring 17 of the synchronous switch 5 is returned to its original position, and hence the first straight portion of the detection spring abuts against the detection pin 18 (short-circuited), whereby the direction of the output signal is changed. The CPU receives the output indicating that the signal is changed to verify that the closing operation of the aperture 1a is initiated. The sector unit U then returns to its original position, that is, it is brought into the closed state. However, the power supply to the drive coil 4b continues in the same direction for a predetermined time period even after the returning action of the drive force transmitting mechanism T and the sector unit U is completed for performing positional adjustment, and then the power supply is turned OFF to return them to their original positions. Upon stopping the power supply to the drive coil 4b, the image data accumulated by the image pickup device during the exposure operation is supplied to the CPU, whereby one picture-taking operation is completed. Data read from the image pickup device is supplied to the storage device in the camera body and stored therein.

Figure 6:
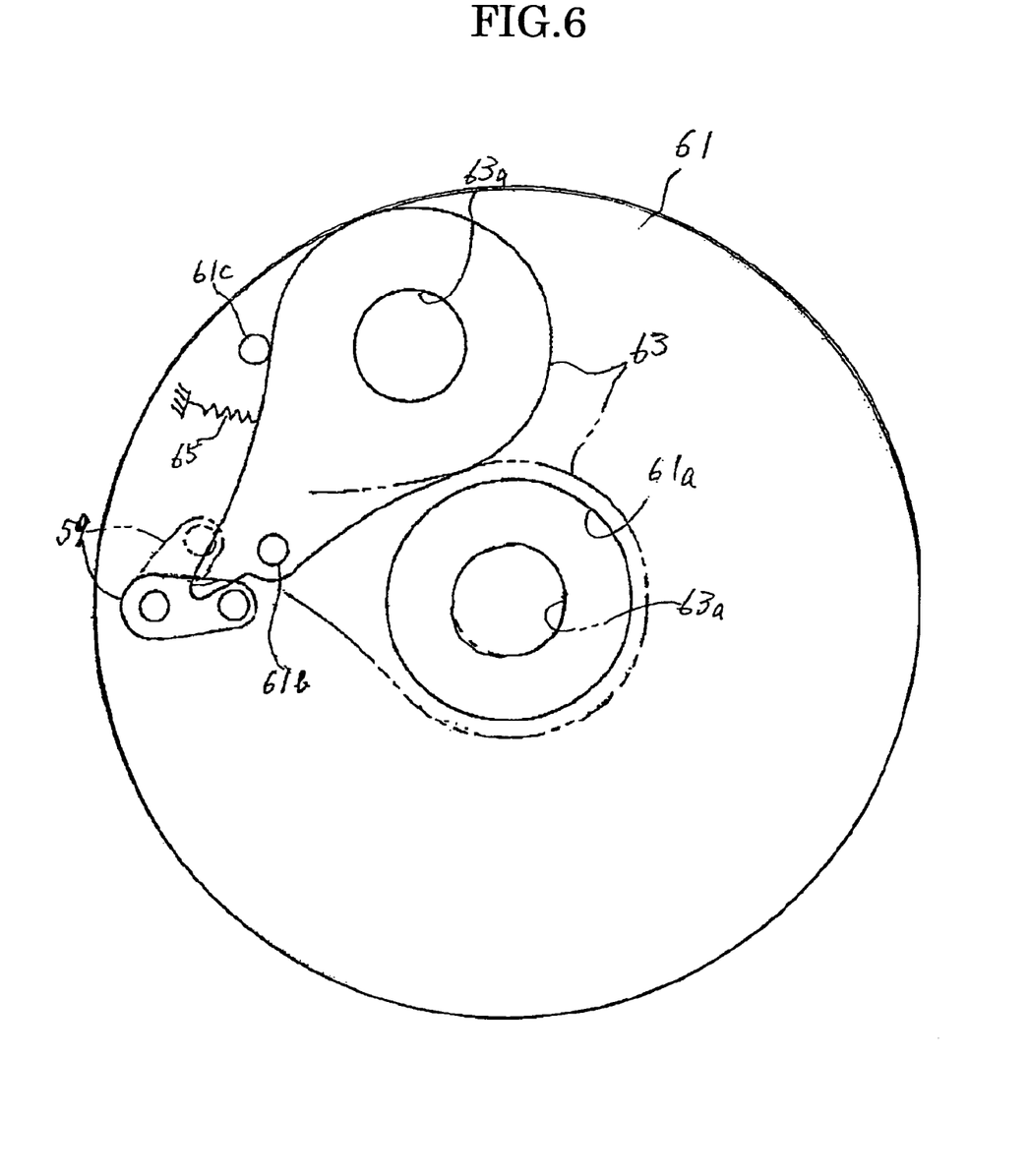
FIG. 6 is a front view showing a sector unit of a diaphragm device according to a second embodiment.

An embodiment in which the sector drive unit according to the present invention is applied to a diaphragm device of a camera will be described below. The diaphragm device relates to that shown in FIGS. 1–5 of the present applicant's Japanese Patent Application No. JP-A-2001-281722. A sector unit U2 is provided with a sector drive lever 59 (corresponding to sector drive lever 9 in FIG. 1) of the sector drive unit according to the present invention on the left side of a circular aperture 61a provided on a base plate 61, as shown in FIG. 6. The sector drive lever 59 pivots within the angular range of about 45° by being interlocked with the drive lever 8 (see FIG. 1), whereby the one or more sectors 63 can pivot. The sector unit U2 is provided with the sector drive unit D in order to drive the sectors 63.

The sectors 63 each have a diaphragm aperture 63a smaller than the aperture 61a, and the sectors 63 are pivotably supported on the base plate 61 via a shaft supporting device 61b projecting from the base plate 61. The diaphragm opening 63a is configured to locate at the center of the aperture 61a under the conditions that the sectors 63 rotate clockwise and then stop at the predetermined position. Although the drive source of the sectors 63 corresponds to the actuator 4 of the sector drive unit D according to the present invention (See FIG. 1) as a matter of course, the sector drive lever 9 of the drive force transmitting mechanism T is modified to the drive lever 59.

The sectors 63 rotate clockwise against an urging force of an urging member 65 by rotating the drive lever 59 counterclockwise from the state shown in the drawing, and the diaphragm opening 63a is positioned at the center of the aperture 61a, whereby a desired aperture value can be selected. The urging force of the urging member 65 is weaker than the retaining force of the actuator 4 with no power supplied thereto. When the power supply to the actuator 4 is turned OFF, and the actuator 4 is retained at a stable position with no power supply, the aperture is retained. When releasing the aperture, the sector drive lever 59 is rotated clockwise by supplying electrical power to the actuator 4 in the opposite direction. Since the sectors 63 are urged counterclockwise by the urging member 65, the sectors 63 return to their original positions and are stopped by a stopper pin 61c.

Figure 7:
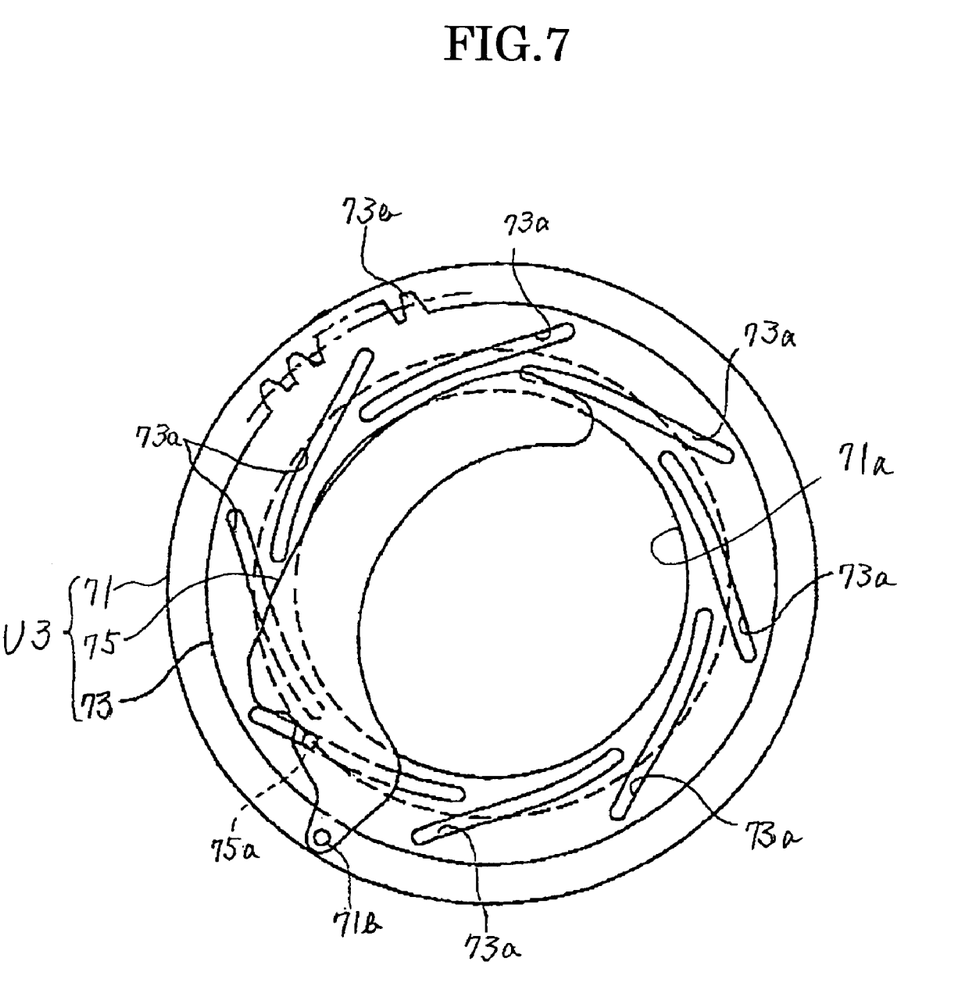
FIG. 7 is a front view showing a sector unit of a diaphragm device according to a third embodiment.

Alternatively, the sector drive unit D according to the present invention can be applied as a drive unit for a sector unit U3 of a diaphragm device of a silver-film-type camera. The sector drive unit D is mounted to the sector unit U3 to drive sectors 75. FIG. 7 shows a configuration of a diaphragm device in a related application of the present applicant (See JP-A-2000-89294, FIG. 1). In FIG. 7, a drive ring 73 is provided on a base plate 71 having an aperture 71a so as to be rotatable along the base plate surface. The drive ring 73 includes eight obliquely-extending elongated grooves 73a . . . , and driven pins 75a of the sectors 75 provided along the periphery of the base plate 71 pivotably at regular intervals slidably engage with the respective elongated grooves 73a. The aperture 71a is configured to be opened and closed by the sectors 75 pivoting with the rotation of the drive ring 73. The drive ring 73 may be connected with the sector drive lever 9 of the drive force transmitting mechanism T (See FIG. 1) of the sector drive unit D according to the present invention in a modified configuration at the teeth 73b provided on the periphery. That is, teeth may be formed on the sector drive lever 9 at the connecting portion instead of the arm member 9b, so that the teeth engage the teeth 73b of the drive ring. However, since the actuator in this case is not suitable for a meter-type which rotates the drive ring 73 by a required amount only by one drive pulse, it is necessary to employ a step-system for stepwise driving the drive ring 73 by a plurality of drive pulses. When a shutter provided with the sector drive unit is employed as the light-shielding device for a digital camera, the same effects as the light-shielding devices similar to the above-described focal-plane shutter are achieved.

While the above description has been made assuming that the supply of power to the drive coil is provided by a constant voltage circuit, it is also possible to employ a constant current circuit as a matter of course. Also, while a gear mechanism is employed as the transmission mechanism of the drive force transmitting mechanism, it is also possible to employ a link mechanism, a slider crank mechanism, and the like alternatively. The sector drive unit may also be applied to the diaphragm device or the light-shielding device other than the above-described light-shielding device or the diaphragm device. Furthermore, while the synchronous switch 5 is configured to detect the fully-opened state of the sectors, it is not limited thereto, and the position of the synchronous switch may be changer so as to detect the fully-closed state of the sectors.

Since the sector drive unit according to the present invention is configured to facilitate attachment to and detachment from the sector unit by unitizing the drive unit, it can be commonly used in various types of sector units. In addition, since it can be commonly used in cameras having different aperture sizes, reduction of indirect cost, such as the cost of equipment may be achieved. Furthermore, the sector drive unit and the sector unit can be inspected separately, and hence when any defect is found in either unit, only the unit in question can be deemed defective, and thus the entire light-shielding device does not have to be discarded. As a result, manufacturing yield can be increased.

As a detailed configuration, the positional adjustment and improved operating direction are achieved by providing a sector urging spring for urging the sector unit in position. Consequently, the speed of the opening operation of the sector unit when starting opening operation can be increased to speed-up the picture-taking operation of the camera, the time lag can be reduced, and the possibility of failing to release the shutter at an adequate time may be reduced. Furthermore, with the sector position detecting unit (synchronous switch), since exposure operation can be stared after verifying that the sectors are fully opened, reliable exposure is achieved. When the sector position detecting unit is configured to switch the output signal immediately after the aperture is fully opened or the diaphragm opening reaches the maximum opened state, the position of the sectors can reliably be kept track, whereby reliable exposure is achieved.

What is claimed is:

1. A sector drive assembly for a camera, comprising:
    a sector unit comprising a base plate having an aperture and one or more sectors for opening and closing the aperture; and
    a sector drive unit comprising a support plate, an electromagnetic actuator mounted to the support plate, an intermediate member disposed between the support plate and the base plate for retaining the electromagnetic actuator in a predetermined position between the support plate and intermediate member, the intermediate member having mounting portions removably mounted to the base plate, and a drive force transmitting mechanism mounted to the support plate for transmitting a drive force of the electromagnetic actuator to the one or more sectors, the sector drive unit being removably mounted as a unit to the base plate.

2. A sector drive assembly for a camera according to claim 1; wherein the sector unit further comprises a sector urging spring for urging the one or more sectors in one direction.

3. A sector drive assembly for a camera according to claim 1; wherein the sector drive unit further comprises a sector position detecting unit for detecting a position of the one or more sectors based on a position of the drive force transmitting mechanism.

4. A sector drive assembly for a camera according to claim 3; wherein the sector position detecting unit comprises a conductive spring element having a portion that undergoes movement with the drive force transmitting mechanism to come into and out of contact with a conductive member.

5. A sector drive assembly for a camera according to claim 1; wherein the one or more sectors each have sector arms connected thereto, and the sector arms are interconnected to cooperatively drive the one or more sectors to open and close the aperture.

6. A sector drive assembly for a camera according to claim 1; wherein the drive force transmitting mechanism has an angular motion converting mechanism for converting a prescribed amount of angular movement of the electromagnetic actuator into an amount of angular movement of the one or more sectors sufficient to drive the one or more sectors from one of an aperture-opening position and an aperture-closing position to the other of the aperture-opening position and the aperture-closing position.

7. A sector drive assembly for a camera according to claim 6; wherein the electromagnetic actuator comprises a pulse motor which undergoes the prescribed amount of angular movement in response to application of a prescribed number of voltage or current pulses to the pulse motor for driving the one or more sectors to either the aperture-opening position or the aperture-closing position depending upon the polarity of the pulses.

8. A sector drive assembly for a camera according to claim 7; wherein the pulse motor comprises a rotor having a plurality of magnetic poles, a stator having a plurality of magnetic poles, and a drive coil for driving the rotor, an angle of rotation of the rotor in response to application of a voltage or current pulse to the drive coil being defined by a relationship between positions of the magnetic poles of the rotor and positions of the magnetic poles provided on the stator.

9. A sector drive assembly for a camera according to claim 8; wherein the positions of the magnetic poles provided on the stator are static stable positions at which the rotor is retained without the supply of power to the drive coil.

10. A sector drive assembly for a camera according to claim 6; wherein the drive force transmitting mechanism comprises a drive gear provided on a drive shaft of the electromagnetic actuator and a sector drive gear driven by the drive gear for driving the one or more sectors.

11. A sector drive assembly for a camera according to claim 1; wherein the intermediate member is detachably connected to the support plate.

12. A sector drive assembly for a camera according to claim 11; wherein the support plate has latch devices engageable with the intermediate member to detachably connect the intermediate member to the support plate.

13. A sector drive assembly for a camera according to claim 1; wherein the intermediate member retains both the electromagnetic actuator and the drive force transmitting mechanism in predetermined positions between the support plate and the intermediate member.

14. A sector drive assembly for a camera according to claim 1; further comprising fixing members insertable through the base plate and engageable with respective ones of the mounting portions to removably mount the sector drive unit to the sector unit.

* * * * *